Aug. 1, 1967 V. POPIN 3,333,490
NON-SLIP DRILL BITS
Filed July 21, 1965
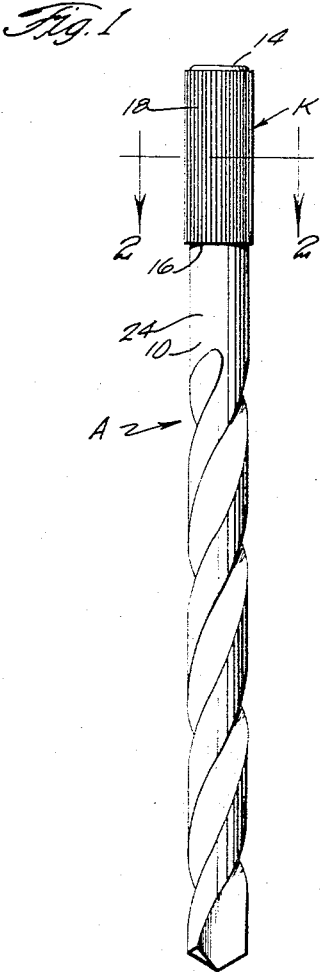
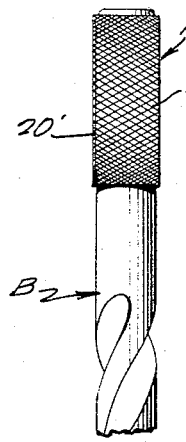
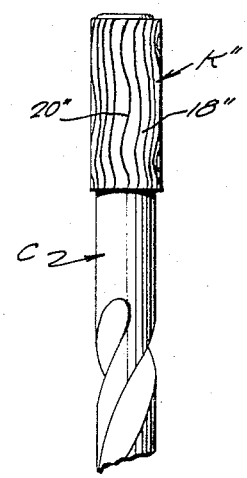
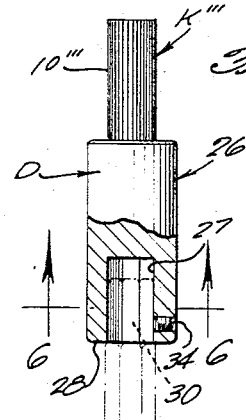
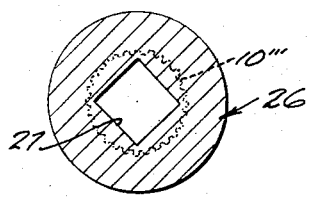
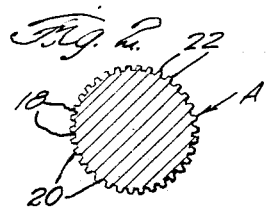
INVENTOR.
VALIMER POPIN
BY
Berman, Davidson & Berman
ATTORNEYS United States Patent Office 3,333,490
Patented Aug. 1, 1967

3,333,490
NON-SLIP DRILL BITS
Valimer Popin, 2 Whitewood Road,
Metuchen, N.J. 08840
Filed July 21, 1965, Ser. No. 473,671
1 Claim. (Cl. 77—71)

ABSTRACT OF THE DISCLOSURE

Anti-slip means for a rotary tool bit consisting of an adapter having a generally cylindrical main body. The main body is formed with a polygonal socket opening at its bottom end to receive a tool bit and has a set screw in the wall of the socket to clamp the tool bit in the socket. The main body has a top projection in the form of a knurled shank projecting upwardly from the body in axial alignment with the socket and being adapted to be clamped in a drill chuck in the manner of a usual tool drill bit.

This invention relates to cylindrical shank drill bits incorporating means for preventing slippage thereof, in drill chucks.

Ordinary drill bits, whether for use in power drills or manually operated drills, have smooth uniform cylindrical shanks, which have the tendency to slip, both rotationally and endwise, in drill chucks, especially where the bits meet binding resistance in the work. These tendencies have disadvantageous aspects, such as the shifting of the work on benches, the production of inaccurate work, failure to take full advantage of the power of a drill, and subjection of the user of the drill to discomfort, loss of control of the drill, and injury due to whipping of the drill out of the hands of the user, in the case of a portable drill.

The primary object of the present invention is the provision of drill bits having cylindrical shanks, adapted to be used in standard or conventional drill chucks, which have specially surfaced enclosed enlarged diameter shank portions which resist slippage thereof in the chucks, and eliminate the above outlined disadvantages.

Another object of the invention is the provision of a drill bits of the character indicated above, wherein the special shank portions, while resisting rotation thereof in drill chucks, provide for both rotative and endwise slippage of the bits, in chucks, where work resistance or binding obtains, which is great enough, otherwise, to produce breakage of the bits, resulting in damage to the work and/or injury to the user.

In the drawings:

FIGURE 1 is a side elevation of a drill bit constructed in accordance with the present invention;

FIGURE 2 is an enlarged horizontal section, taken on the line 2—2 of FIGURE 1;

FIGURES 3 and 4 are fragmentary side elevations of modified forms of drill bits of the present invention;

FIGURE 5 is a side elevation, partly broken away and in section, showing an adapter for polygonal drill bit shanks, the adapter embodying non-slip construction, common to the illustrated drill bits; and FIGURE 6 is an enlarged horizontal cross section, taken on the line 6—6 of FIGURE 5.

Referring in detail to the drawings, and first to FIGURES 1 and 2 thereof, A designates a drill bit having a cylindrical shank 10, which is conventional in form, except for a slightly enlarged diameter knurled portion K produced on the shank, and extending from the proximal end 14 of the shank, to a point 16, this distance substantially conforming to the effective axial dimensions of conventional drill chucks, in which the bit A is adapted to be used.

The knurled portion K is characterized, as indicated in FIGURE 2, with equally circumferentially spaced, relatively deep parallel grooves 18, which are parallel to the longitudinal axis of the shank, and produce equally circumferentially spaced, similar cross section relatively deep lands 20. The outer edges 22 of the lands 20 have the same radius of curvature as the surface of the smooth main portion 24 of the shank 10.

FIGURE 3 shows a drill bit B, which is similar to drill bit A, except that its knurled portion K', is characterized by intersecting spiral grooves 18', of smaller cross section, which produce spiral intersecting lands 20' of cross sections smaller than the lands 20 of the drill bit A.

The drill bit, shown in FIGURE 4, differs from bits A and B, only in that its knurled portion K", is characterized by relatively deep wavy longitudinal grooves 18", which define therebetween relatively deep wavy longitudinal lands 20", of relatively greater width than the lands of drill bits A and B.

In use and operation, because the sides of the outer edges of the lands of drill bits, A, B, and C tend to bite into the drill chuck members, the knurled drill bit portions resist, to a substantially greater extent than smooth shank bits, any tendency, under work stress, to rotate in the drill chucks, and to move endwise relative thereto.

However, in the event of work resistance, of the order likely otherwise to cause snapping of the drill bits, the reduced over-all contact surfaces of the knurled portions, represented by the outer edges of the lands thereof, permit the drill bits to rotate in tool chucks, so as to prevent such snapping; and also to permit longitudinal or endwise movements of the bits, in the chucks.

FIGURES 5 and 6 show, in extension of the above described provisions for the prevention of slipping of drill bits in drill chucks, under normal work-loads, an adapter D for polygonal tool shanks is provided. The adapter D comprises a relatively short shank 10''' embodying a knurled portion K''', optionally similar to those of FIGURES 1 and 2, the shank 10''' being fixed axially to the proximal end of a chuck body 26, formed with a polygonal socket 27, opening to its distal end 28. A drill bit having a polygonal shank 30, such as a tap 32, is adapted to be inserted in the socket 26, and retaining therein, as by means of a set screw 34. The knurled adapter shank is then adapted to be inserted and clamped in a drill chuck in the usual way.

The term "relatively deep," as used herein, means a depth substantially greater than usually obtained in conventional knurling, considering the diameters and areal extents of the knurled surfaces involved.

What is claimed is:

A rotary tool having a shank formed at its top end with an enlarged-diameter drill chuck-engaging portion, said portion being substantially cylindrical and having a knurled outer surface formed by relatively deep wavy non-parallel longitudinal grooves which define therebetween relatively deep wavy longitudinal lands of varying widths.

References Cited

UNITED STATES PATENTS

| 987,659 | 3/1911 | Wells | 10—129 |
| 2,787,797 | 4/1957 | Kalafsky | 10—129 |

FOREIGN PATENTS

| 133,442 | 7/1949 | Australia. |
| 504,139 | 7/1951 | Belgium. |
| 596,087 | 8/1925 | France. |

FRANCIS S. HUSAR, *Primary Examiner.*